US 8,328,706 B2

Dec. 11, 2012

(12) United States Patent
Gombert et al.

(10) Patent No.: US 8,328,706 B2
(45) Date of Patent: Dec. 11, 2012

(54) SYSTEM AND METHOD FOR CONVERTING A PRINTED SUBSTRATE

(75) Inventors: Barry Glynn Gombert, Rochester, NY (US); John Oliver Walker, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 428 days.

(21) Appl. No.: 12/640,990

(22) Filed: Dec. 17, 2009

(65) Prior Publication Data

US 2011/0152048 A1    Jun. 23, 2011

(51) Int. Cl.
*B31B 1/14*    (2006.01)

(52) U.S. Cl. .............. 493/53; 493/55; 493/59; 493/160; 493/396

(58) Field of Classification Search .......... 493/53, 493/55, 56, 59, 64, 160, 161, 396, 399, 403
See application file for complete search history.

(56) References Cited

U.S. PATENT DOCUMENTS

| | | | | |
|---|---|---|---|---|
| 2,813,464 A | * | 11/1957 | La Bombard | 493/59 |
| 5,520,604 A | * | 5/1996 | Reist | 493/422 |
| 5,805,784 A | | 9/1998 | Crawford | |
| 5,838,574 A | | 11/1998 | Olson et al. | |
| 5,964,686 A | * | 10/1999 | Bidlack et al. | 493/59 |
| 6,090,027 A | | 7/2000 | Brinkman | |
| 6,117,061 A | | 9/2000 | Popat et al. | |
| 6,134,018 A | | 10/2000 | Dziesietnik et al. | |
| 6,139,480 A | * | 10/2000 | Moss et al. | 493/55 |
| 6,243,172 B1 | | 6/2001 | Gauthier et al. | |
| 6,245,004 B1 | * | 6/2001 | Waters | 493/61 |
| 6,246,468 B1 | | 6/2001 | Dimsdale | |
| 6,332,149 B1 | | 12/2001 | Warmus et al. | |
| 6,687,016 B2 | | 2/2004 | Gauthier | |
| 6,689,035 B1 | * | 2/2004 | Gerber | 493/320 |
| 6,771,387 B2 | | 8/2004 | Gauthier | |
| 6,895,549 B1 | | 5/2005 | Albright et al. | |
| 6,939,063 B2 | | 9/2005 | Bussell | |
| 6,948,115 B2 | | 9/2005 | Aizikowitz et al. | |
| 7,013,616 B1 | | 3/2006 | Powers et al. | |
| 7,182,007 B2 | * | 2/2007 | Berge et al. | 83/13 |
| 7,197,465 B1 | | 3/2007 | Hu et al. | |
| 7,293,652 B2 | | 11/2007 | Learn et al. | |
| 7,406,194 B2 | | 7/2008 | Aizikowitz et al. | |

(Continued)

FOREIGN PATENT DOCUMENTS

WO    2005000681 A2    1/2005

(Continued)

OTHER PUBLICATIONS

Liang Lu et al., "Folding Cartons with Fixtures: A Motion Planning Approach", IEEE Transactions on Robotics and Automation, vol. 16, No. 4, Aug. 2000.

(Continued)

*Primary Examiner* — Hemant M Desai
(74) *Attorney, Agent, or Firm* — Fox Rothschild LLP

(57) ABSTRACT

A system for forming a foldable printed substrate includes a creasing system that applies a plurality of creases to the substrate along a first axis. It also applies a plurality of creases to the substrate along a second axis that is angled with respect to the first axis. Each creases is applied in a manner that does not ablate the substrate. The system also may include a cutting system to yield a foldable substrate such as a carton, sleeve, or box. It also may include a printing system to generate a printed, foldable substrate.

21 Claims, 6 Drawing Sheets

U.S. PATENT DOCUMENTS

| | | | |
|---|---|---|---|
| 7,758,484 B2 * | 7/2010 | Peterson | 493/212 |
| 2002/0053176 A1 * | 5/2002 | Colson et al. | 52/506.06 |
| 2002/0123418 A1 * | 9/2002 | Davison et al. | 493/340 |
| 2003/0035138 A1 | 2/2003 | Schilling | |
| 2005/0050052 A1 | 3/2005 | Zimmerman et al. | |
| 2005/0166744 A1 * | 8/2005 | Berge et al. | 83/879 |
| 2005/0247173 A1 * | 11/2005 | Alsten et al. | 83/13 |
| 2005/0278614 A1 | 12/2005 | Aizikowitz et al. | |
| 2005/0278621 A1 | 12/2005 | Aizikowitz et al. | |
| 2006/0116263 A1 * | 6/2006 | Rathbun et al. | 493/59 |
| 2007/0112460 A1 | 5/2007 | Kiselik | |
| 2008/0108490 A1 * | 5/2008 | Kocherga et al. | 493/59 |
| 2009/0282782 A1 | 11/2009 | Walker et al. | |
| 2009/0287632 A1 | 11/2009 | Gombert et al. | |
| 2009/0287717 A1 | 11/2009 | Gombert et al. | |
| 2010/0006628 A1 * | 1/2010 | Jensen | 229/5.5 |
| 2011/0301010 A1 * | 12/2011 | Kling | 493/405 |

FOREIGN PATENT DOCUMENTS

| | | |
|---|---|---|
| WO | 2005054983 A2 | 6/2005 |
| WO | 2005122079 A2 | 12/2005 |

OTHER PUBLICATIONS http:/www.esko.com/webdocs/tmp/080606115325/G2558322_Kongsberg_tables_us_pdf.

* cited by examiner

SYSTEM AND METHOD FOR CONVERTING A PRINTED SUBSTRATE

BACKGROUND

The disclosed embodiments relate generally to methods and systems for creating a printed, converted substrate.

When creating a package, greeting card, or other printed substrate that is foldable into a three-dimensional structure, the substrate must be converted by applying one or more scores, slits, creases or perforations along which the substrate can be cut and/or folded. For example, referring to FIG. 1, a cardboard or rigid paper sleeve may be made of a cardboard or heavy paper substrate 10 that is cut along a border (indicated as solid lines 12), and scored along a set of score lines (indicated as dashed lines 14) to form a set of panels or facets 16. When the substrate shown in FIG. 1 is folded along the score lines, a rectangular sleeve is created. Each of the four facets 16 forms one side of the sleeve. FIGS. 2A through 2E show various cutting and scoring combinations that may be used to form various carton structures. In FIGS. 2A through 2E, solid lines represent cuts, and dashed lines indicate score lines.

Score lines are formed by creating an indentation along a line where the substrate is to be folded. In recent years, the use of lasers in scoring processes has been expanding. Laser scoring is the process of focusing a spot of energy to ablate a specified amount of material from the substrate. This creates a channel or groove that provides a relatively uniform line of weakness in the substrate to facilitate folding.

One of the problems with laser scoring processes is that when a laser is applied to a substrate, it removes material and weakens the substrate. In many cases, especially with thinner substrates such as thin cardboard or paper-based materials, the final structural design may be compromised.

SUMMARY

In an embodiment, a system for forming a three-dimensional printed substrate includes a creasing system that is configured to receive a substrate and apply a plurality of creases to the substrate. The creasing system includes a drive mechanism configured to move the substrate along a first axis, a first non-ablating creasing, member configured to apply a first crease to the substrate in a direction parallel to the first axis as the substrate moves along the first axis, and a second non-ablating creasing member configured to apply a second crease to an interior portion of the substrate in a direction that is not parallel to the first axis.

Each creasing member may include a roller, bearing, gear, or other rotatable member. The drive system may include a set of rollers and axles, or other appropriate structure such as a conveyor. Optionally, the drive mechanism may be configured to move the substrate along the first axis while the second creasing member moves along the second axis so that the second crease is applied at an angle with respect to the first crease.

The system also may include a printer configured to print an image on a substrate and form a printed substrate, as well as a transport mechanism configured to transport the printed substrate to the creasing system.

The system also may include a backing structure positioned to support the substrate as the first and/or the second creasing member applies its crease to the substrate. The system also may include a laser scoring or other cutting system configured to receive the printed and creased substrate and apply cuts to the substrate to yield a printed flat. Optionally, the system also may include an engagement system that engages and disengages a moveable creasing member so that the movable creasing member may move to various locations on the substrate. When the flat is folded along the creases, it results in a three-dimensional object.

In an alternate embodiment, a method of preparing a foldable substrate includes receiving a paper-based substrate into a creasing system; using a first creasing member to apply a first crease along a first axis while using one or more drive members to move the substrate in the direction of the first axis; and using a second creasing member to apply a second crease to the substrate while holding, the substrate still in the creasing device. Thus, the second crease will be positioned along an axis that is perpendicular to the first axis. Optionally, the method also may include repositioning the second creasing member multiple times into multiple positions so that the second creasing member will apply additional creases along the direction of the second axis.

BRIEF DESCRIPTION OF THE DRAWINGS

Aspects, features, benefits and advantages of the embodiments described in this document will be apparent with regard to the following description, appended claims, and accompanying drawings where:

DETAILED DESCRIPTION

Before the present methods and systems are described, it is to be understood that this invention is not limited to the particular systems, methodologies or protocols described, as these may vary. The terminology used in this document is for the purpose of describing particular embodiments only, and it is not intended to limit the scope of the present disclosure.

As used in this document and in the appended claims, the singular forms "a," "an," and "the" include the plural reference unless the context clearly dictates otherwise. The term "comprising" means "including, but not limited to." Unless defined otherwise, all technical and scientific terms used herein have the same meanings as commonly understood by one of ordinary skill in the art.

Figure 1:
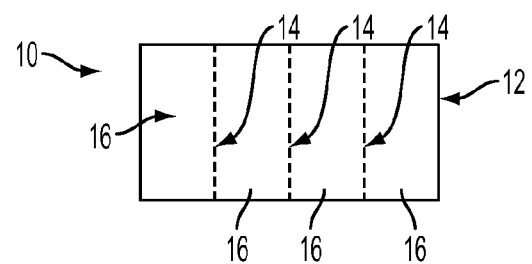
FIG. 1 illustrates a foldable substrate structure that may be found in the prior art.
Figure 2A:
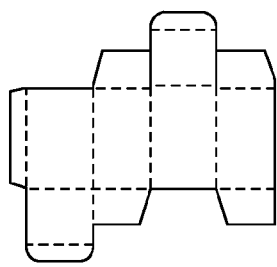
FIGS. 2A through 2F illustrate additional foldable substrate structures that may be found in the prior art.
Figure 2B:
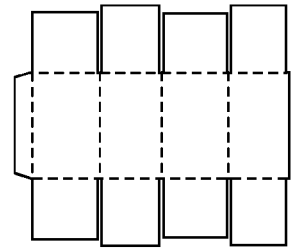
Figure 2C:
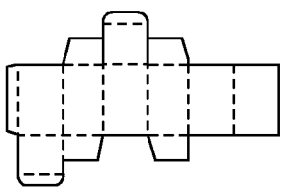
Figure 2D:
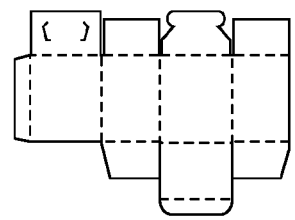
Figure 2E:
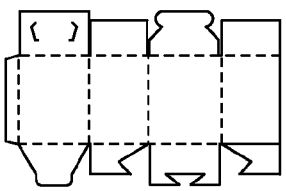
Figure 2F:
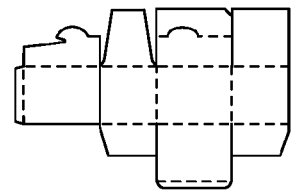
Figure 3:
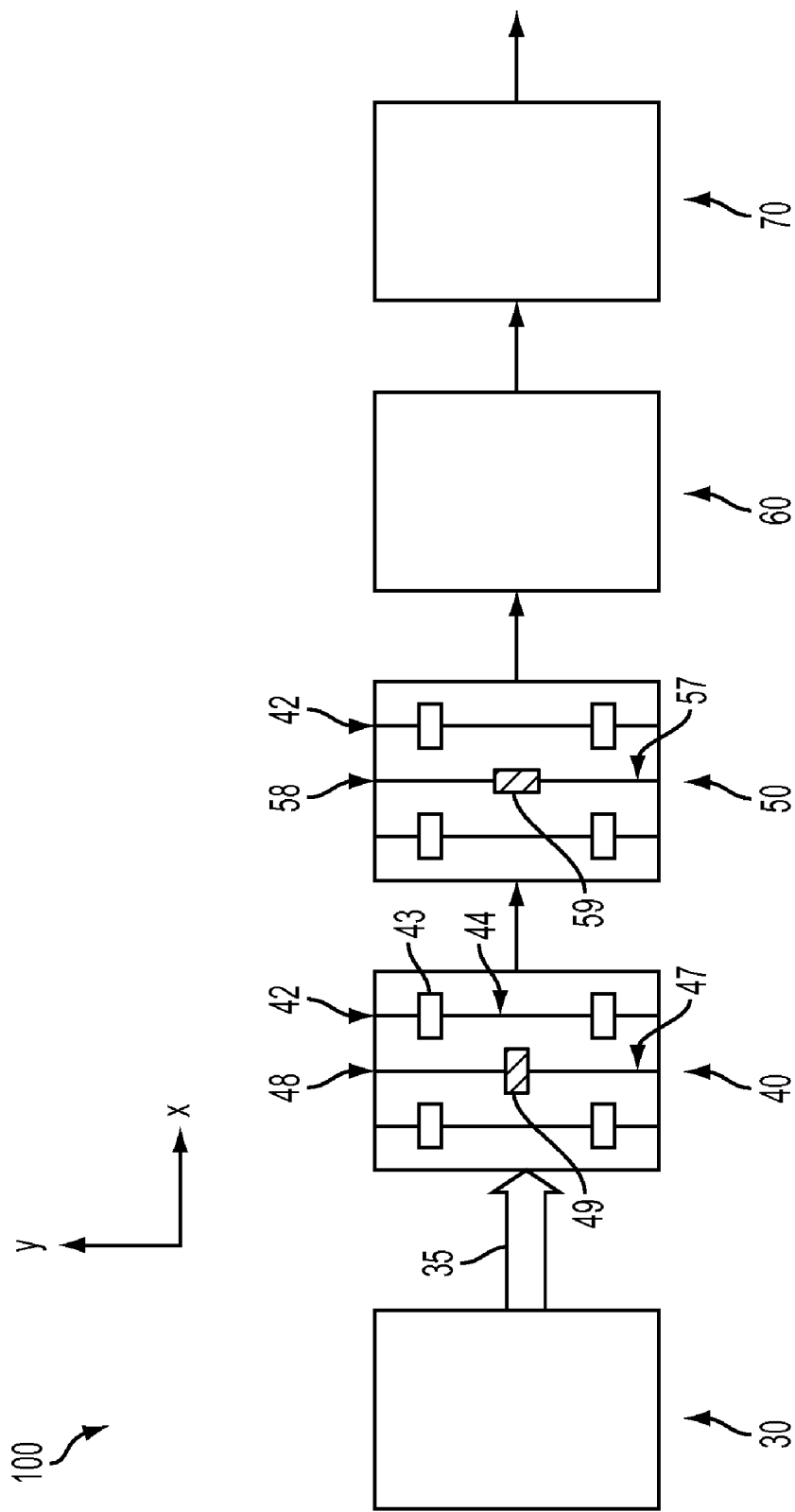
FIG. 3 is a block diagram depicting various elements of a system for creating a printed, foldable substrate.

FIG. 3 illustrates a system 100 for creating a foldable printed substrate, such as a package, carton, box, or other three-dimensional structure. In some embodiments, the system may include a printing device 30, such as a laser printer, ink jet printer, or a xerographic printing device that applies ink or toner to the substrate to create characters, graphics, and/or other printed features. In other embodiments, the system 100 may not include a printing device, but instead it may receive a blank substrate or a substrate on which material has been pre-printed. A transport mechanism 35 such as a conveyor or other transport device may move and/or guide the printed substrate into subsequent stations.

The system 100 also includes one or more creasing stations 40, 50. Each creasing station 40, 50 may receive the substrate and include a drive mechanism 42 that moves the substrate through the creasing station along the direction of a first axis, indicated as an x-axis in FIG. 3. In some embodiments, each drive mechanism 42 may include a combination of rollers 43 and axles 44 that turn and move a substrate through the creasing station along the direction of a first axis, indicated as an x-axis in FIG. 3. Alternatively, the drive mechanism may include one or more conveyors or other structures that move the substrate through the station. Each creasing station includes one or more non-ablating creasing members 48, 58 configured to apply at least a first crease to the substrate from a first edge of the substrate to the second edge of the substrate. Each non-ablating creasing member may include a structure such as a roller 49, 59 and axle 47, 57, although other structures are possible. The roller or other relevant structure of each creasing member is positioned to apply a force to the substrate and compress the substrate in a manner that does not scrape, burn, or otherwise ablate the substrate in any substantial manner.

Figure 4A:
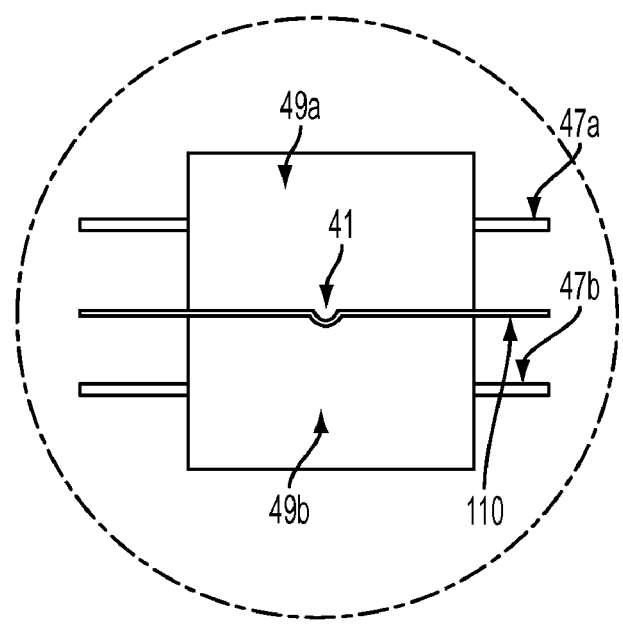
FIGS. 4A-4C illustrate exemplary elements of, and results generated by, a first creasing station that applies creases to a substrate along a first axis.
Figure 4B:
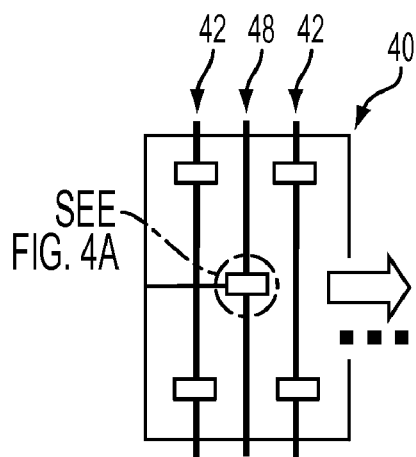
Figure 4C:
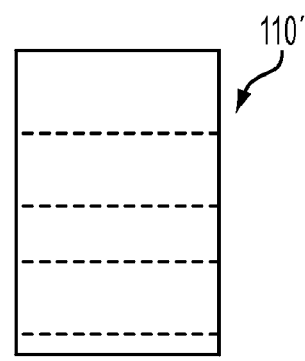

FIGS. 4A-4C illustrate various elements of a first creasing station 40 that applies creases to the substrate in the direction of the x-axis of FIG. 3. Referring to FIG. 4B, the creasing station 40 includes one or more drive mechanisms 42 that move the substrate in a the first direction (i.e., the x-axis of FIG. 3) and a creasing member 48 that applies a crease to the substrate as the substrate moves through the station. FIG. 4A is a cut-away perspective view of the creasing station, showing an exemplary creasing mechanism made up of an upper roller 49a that is connected to an upper axle 47a, along with a optional lower roller 49b that is connected to a lower axle 47b. At least one of the rollers 49a may include a protruding element 41 that contacts the substrate 110 as the substrate 110 moves through the creasing station, thus compressing the substrate and imposing a score line into the substrate 110. Optionally, the lower roller 49b may include a receiving element positioned to correspond to the protruding element, or alternatively it may include a flat surface, or it may include a second protruding element to increase the compression and create an indentation on both surfaces of the substrate. This process may be repeated in the creasing station 40 by repositioning the creasing mechanism and running the substrate through the creasing station to apply additional creases. Alternatively, the first creasing station 40 may include multiple creasing elements that are positioned to apply a crease the substrate in multiple locations as the substrate passes through. Either way, referring to FIG. 4C, the resulting substrate 110' may include multiple parallel score lines (shown as dashed lines in FIG. 4C) that extend from one edge of the substrate to the opposite edge along which the substrate may be folded.

Figure 5A:
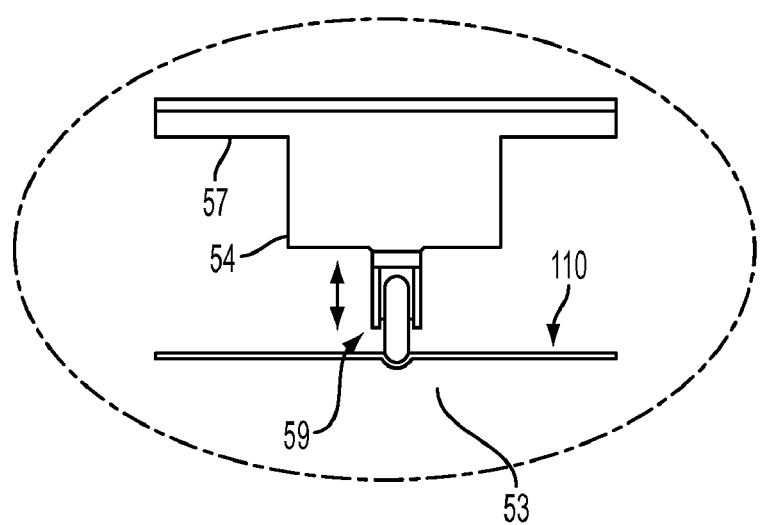
FIGS. 5A-5C illustrate exemplary elements of, and results generated by, a first second creasing station that applies creases to the substrate along a direction that is perpendicular to the first axis.
Figure 5B:
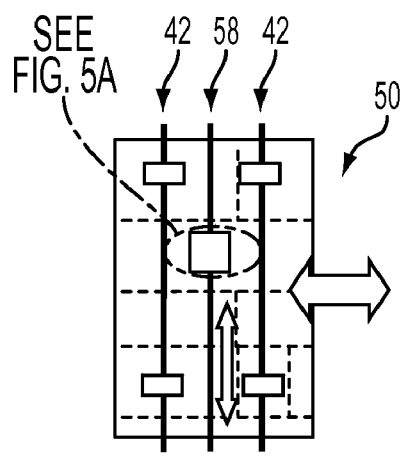
Figure 5C:
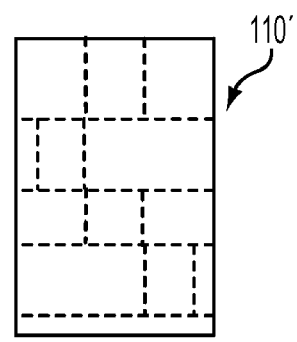

FIGS. 5A-5C illustrate various elements of a second creasing station 50 that applies creases to the substrate in a direction that is not parallel to the direction of the creases applied by the first creasing station e.g., the y-axis of FIG. 3). Referring to FIG. 5B the creasing station 50 includes one or more drive mechanisms 42 that move the substrate in the first direction (i.e., the x-axis of FIG. 3) and a creasing, member 58 that applies a crease to the substrate in a second direction by moving in a direction that is perpendicular to the first direction x-axis). If the substrate sits still within the second creasing station 50, the crease applied by the second creasing station will be parallel to that applied by the first creasing station. Alternatively, if the substrate moves within the second creasing station 50 while the second creasing member is moved, the crease applied by the second creasing station will be positioned at an angle to that applied by the first creasing station. The angle may be varied by changing the speed of movement of the substrate and/or the second creasing member.

FIG. 5A is a cut-away perspective view of the second creasing station, showing an exemplary creasing mechanism made up of a roller 59 that is connected to and extends from an transport mechanism 57. Other structures such as bearings or similar rotatable members may be used. The creasing mechanism also may include a base or backing roller 53 on which the substrate rests as the creasing, roller 59 is applied to the substrate. The roller 59 moves along the transport mechanism 57 in the direction of the y-axis and imparts a crease by applying, a downward force to the substrate 110.

The creasing member may include an engagement system 54 that engages or disengages the creasing member from the substrate by lifting it away or pushing it toward the substrate. This process may be repeated in the creasing station 50 by lifting the creasing roller 59 and repositioning the creasing mechanism 58 to apply additional creases to the substrate. Optionally, the engagement system may be automated and automatically move up, down, and into various positions based on a set of computer-readable instructions that are stored in a computer-readable memory.

Because the creasing, roller 59 of the second creasing station may be engaged with and disengaged from the substrate, the creases applied along the y-axis need not extend from one edge of the substrate to the other. Instead, smaller creases may be applied that extend along only an interior portion of the substrate, and not all the way to both edges. In some embodiments, the first creasing station also may include an engagement system so that some or all of the creases that are applied along the x-axis need not extend across the entire edge-to-edge length of the substrate.

In some embodiments, the second creasing station 50 may include multiple creasing elements that are positioned to each apply a crease to the substrate in multiple locations. Either way, referring to FIG. 5C, the resulting substrate 110' may include multiple parallel score lines along which the substrate may be folded.

In some embodiments, when multiple creases are applied to a substrate, the force applied by each tool, or the tool itself, may be varied so that creases of varying radii are applied. This enables the production of a substrate with inner facets (which may be bounded by creases having smaller radii) and outer facets (bounded by creases with larger radii) that overlap one or more of the inner facets when the substrate is folded into a three-dimensional structure.

In some embodiments, a creasing system may include two or more creasing stations such as the first creasing station 40 and second creasing station 50 shown in the Figures. Alternatively, a single creasing station may include all drive mechanisms and non-ablating creasing members 48, 58 that are needed to apply score lines to the substrate. The forces applied by each creasing member may, in some embodiments, be substantially uniform to create uniform lines of weakness in the substrate. Although the Figures and embodiments described above describe each creasing member as a roller, alternatively a bearing, gear, or other rotatable member may be used to apply the crease to the substrate.

Figure 6A:
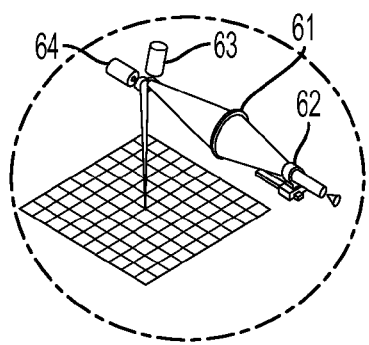
FIGS. 6A-6C illustrate exemplary elements of, and results generated by, a cutting station.
Figure 6B:
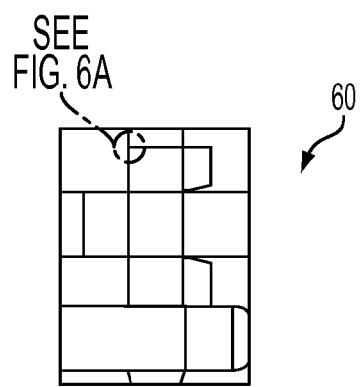
Figure 6C:
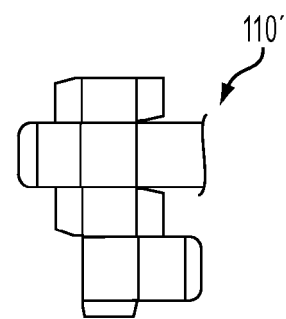

Referring back to FIG. 3, the system 100 also may include a cutting station 60 and/or a converting system 70. As illustrated in FIGS. 6A-6C, in some embodiments the cutting station 60 may be a laser cutting station that includes a two-axis or three-axis laser cutter including elements such as a focusing lens 61, moving lens 62, and one of more galvanometer scanners to cut the substrate along various cutting lines to yield a finished substrate 110' of a particular shape. The cutting station 60 applies cuts to the substrate to yield a printed flat 110' that, when folded along the creases, results in a three-dimensional object. Alternatively, or in addition, a converting system 70 may service to apply both creases and cuts to the substrate by including both one or more creasing members and a cutting element such as a laser cutter.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for forming a three-dimensional printed substrate, comprising:
   a creasing system configured to receive a substrate and apply a plurality of creases to the substrate, the creasing system comprising:
      a first creasing station comprising one or more non-ablating first creasing members configured to apply at least a first crease to the substrate in a direction parallel to the first axis as the substrate moves along a first axis, and
      a second creasing station comprising one or more non-ablating second creasing members configured to apply at least a second crease to an interior portion of the substrate in a direction that is not parallel to the first axis;
   a cutting station comprising a laser scoring system configured to receive the printed and creased substrate from the creasing system and apply a plurality of cuts to the substrate to yield a printed flat that, when folded along the creases, results in a three-dimensional object; and
   at least one drive system configured to move the substrate through each of the stations.

2. The system of claim 1, further comprising a backing structure positioned to support the substrate as at least one of the first or second creasing members applies its crease to the substrate.

3. The system of claim 1, further comprising an engagement system that engages and disengages a moveable creasing member so that the movable creasing member may move to various locations on the substrate.

4. The system of claim 1, wherein each creasing member comprises a roller, bearing, gear, or other rotatable member.

5. The system of claim 1, wherein the drive system comprises a plurality of rollers and axles.

6. The system of claim 1, wherein the drive system comprises a conveyor.

7. The system of claim 1, further comprising:
   a printer configured to print an image on a substrate and form a printed substrate; and
   a transport mechanism configured to transport the printed substrate from the printer to the creasing system.

8. The system of claim 1, wherein the direction that is not parallel to the first axis is perpendicular to the first axis.

9. The system of claim 1, wherein the at least one drive system is configured to move the substrate along the first axis while the one or more creasing members that are configured to apply the second crease move along the second axis so that the second crease is applied at an angle with respect to the first crease.

10. The system of claim 1, wherein the second creasing station further comprises a roller having a protruding element that is configured to score the substrate as the substrate moves through the second creasing station.

11. The system of claim 1, wherein the first creasing station comprises multiple creasing elements that are positioned to apply creases to the substrate in multiple locations as the substrate passes through the first creasing station such that the creases include creases having first radii and creases having second radii, wherein the first radii are smaller than the second radii.

12. A system for forming a three-dimensional printed substrate, comprising:
   a printer configured to print an image on a substrate and form a printed substrate;
   a creasing system configured to receive the printed substrate and apply a plurality of creases to the substrate, the creasing system comprising:
      a first non-ablating creasing member configured to apply a first crease to the substrate from a first edge of the substrate to the second edge of the substrate along the first axis, and
      a second non-ablating creasing member configured to apply a second crease to an interior portion of the substrate in a direction that is not parallel to the first axis; and
   a laser cutting system configured to receive the substrate from the creasing system and cut the substrate into a flat that may be folded along the creases to result in a three-dimensional object; and
   at least one drive mechanism configured to move the substrate through each of the systems.

13. The system of claim 12, wherein at least one of the first non-ablating creasing member and the second non-ablating creasing member comprises a roller.

14. The system of claim 12, wherein the creasing system further comprises an engagement system that engages and disengages at least one of the creasing members from the substrate so that the creasing member may be moved to various locations on the substrate.

15. The system of claim 12, wherein the drive mechanism is configured to move the substrate along the first axis while the second creasing member moves in a direction perpendicular to the first so that the second crease is applied at an angle with respect to the first crease.

16. The system of claim 12, wherein the creasing system comprises multiple creasing elements that are positioned to apply creases to the substrate in multiple locations as the substrate passes through the creasing system such that the creases include creases having first radii and creases having second radii, wherein the first radii are smaller than the second radii.

17. A method of preparing a foldable substrate, comprising:
   receiving a paper-based substrate into a creasing system;
   applying, by a first creasing member of the creasing system, a first crease along a first axis while moving, via one or more drive members of the creasing system, the substrate in the direction of the first axis; and
   while holding the substrate still in the creasing system, using a second creasing member of the creasing system to impart a second crease along a second axis, wherein the second axis is perpendicular to the first axis;
   moving the substrate to a laser cutting station; and
   using the laser cutting system to cut the substrate along a plurality of cut lines.

18. The method of claim 17, further comprising, before the receiving:
   printing, via a printing device, printed material onto the substrate to yield a printed substrate; and
   transporting the printed substrate to the creasing system.

19. The method of claim 17, further comprising:
   repositioning the first creasing member a plurality of times into a plurality of positions, and
   applying, by the first creasing member, a plurality of additional creases along the direction of the first axis at the plurality of positions.

20. The method of claim 19, further comprising:

repositioning the second creasing member a plurality of times into a plurality of positions, and applying, by the second creasing member, a plurality of additional creases along the direction of the second axis, wherein the additional creases have radii that are smaller than radii of the creases applied by the first creasing member.

21. The method of claim 17, further comprising using a protruding element that extends from one of the drive members to score the substrate as the substrate moves through the creasing system.

* * * * *